(12) United States Patent
Kitaura

(10) Patent No.: US 12,214,776 B2
(45) Date of Patent: Feb. 4, 2025

(54) PARKING ASSISTANCE DEVICE AND PARKING ASSISTANCE METHOD

(71) Applicant: DENSO CORPORATION, Kariya (JP)

(72) Inventor: Shinji Kitaura, Kariya (JP)

(73) Assignee: DENSO CORPORATION, Kariya (JP)

( * ) Notice: Subject to any disclaimer, the term of this patent is extended or adjusted under 35 U.S.C. 154(b) by 37 days.

(21) Appl. No.: 17/818,877

(22) Filed: Aug. 10, 2022

(65) Prior Publication Data

US 2022/0379879 A1 Dec. 1, 2022

Related U.S. Application Data

(63) Continuation of application No. PCT/JP2021/004800, filed on Feb. 9, 2021.

(30) Foreign Application Priority Data

Feb. 12, 2020 (JP) ................. 2020-021696

(51) Int. Cl.
| | |
|---|---|
| *B60W 30/06* | (2006.01) |
| *B60W 40/076* | (2012.01) |
| *G06V 20/58* | (2022.01) |
| *G06V 20/64* | (2022.01) |
| *G06V 30/224* | (2022.01) |

(52) U.S. Cl.
CPC .......... *B60W 30/06* (2013.01); *B60W 40/076* (2013.01); *G06V 20/586* (2022.01); *G06V 20/64* (2022.01); *G06V 30/224* (2022.01); *B60W 2420/403* (2013.01); *B60W 2552/15* (2020.02); *B60W 2556/20* (2020.02)

(58) Field of Classification Search
None
See application file for complete search history.

(56) References Cited

U.S. PATENT DOCUMENTS

| | | | | |
|---|---|---|---|---|
| 2014/0350855 | A1* | 11/2014 | Vishnuvajhala | G07C 1/30 |
| | | | | 701/538 |
| 2017/0329342 | A1* | 11/2017 | Kazama | G05D 1/0287 |
| 2017/0330460 | A1* | 11/2017 | Massey | G08G 1/146 |
| 2018/0222471 | A1* | 8/2018 | Kiyokawa | B62D 15/027 |
| 2020/0055522 | A1 | 2/2020 | Kasai et al. | |

FOREIGN PATENT DOCUMENTS

| | | |
|---|---|---|
| JP | 2009-145118 A | 7/2009 |
| JP | 2010-186257 A | 8/2010 |
| JP | 5015749 B2 | 8/2012 |
| JP | 2019-77420 A | 5/2019 |

* cited by examiner

*Primary Examiner* — John F Mortell
(74) *Attorney, Agent, or Firm* — Maschoff Brennan

(57) ABSTRACT

In a parking assistance device for moving a vehicle from a current location to a scheduled parking location and parking the vehicle at the scheduled parking location, parking information indicated by a parking assistance code includes obstacle information which is information about obstacles in a parking area, and target location information which is information about a target parking location. A route generation unit is configured to generate a parking route from a current location to a scheduled parking location that is set to the target parking location indicated by the target location information, while avoiding the obstacles indicated by the obstacle information.

7 Claims, 4 Drawing Sheets

FIG.4

| 0 | 0 | 0 | 0 | 0 | 0 | 0 | 0 | 0 | 0 | 0 | 0 | 0 | 0 |
|---|---|---|---|---|---|---|---|---|---|---|---|---|---|
| 0 | 0 | 0 | 0 | 1 | 1 | 1 | 1 | 1 | 1 | 1 | 1 | 1 | 0 |
| 0 | 0 | 0 | 0 | 1 | 0 | 0 | 0 | 0 | 0 | 0 | 0 | 1 | 0 |
| 0 | 0 | 0 | 0 | 1 | 0 | 0 | 0 | 0 | 0 | 0 | 0 | 1 | 0 |
| 0 | 0 | 0 | 0 | 1 | 0 | 0 | 0 | 0 | 0 | 0 | 0 | 1 | 0 |
| 0 | 0 | 0 | 0 | 1 | 0 | 0 | 0 | 0 | 0 | 0 | 0 | 1 | 0 |
| 0 | 0 | 0 | 0 | 1 | 0 | 0 | 0 | 0 | 0 | 0 | 0 | 1 | 0 |
| 0 | 1 | 1 | 1 | 1 | 0 | 0 | 0 | 0 | 0 | 0 | 0 | 1 | 0 |
| 0 | 1 | 0 | 0 | 0 | 0 | 0 | 0 | 0 | 0 | 0 | 0 | 1 | 0 |
| 0 | 1 | 0 | 0 | 0 | 0 | 0 | 0 | 0 | 0 | 0 | 0 | 1 | 0 |
| 0 | 1 | 0 | 0 | 0 | 0 | 0 | 0 | 0 | 0 | 0 | 0 | 1 | 0 |
| 0 | 1 | 0 | 0 | 0 | 0 | 0 | 0 | 0 | 0 | 0 | 0 | 1 | 0 |
| 0 | 1 | 0 | 0 | 0 | 0 | 0 | 0 | 0 | 0 | 0 | 0 | 1 | 0 |
| 0 | 1 | 0 | 0 | 0 | 0 | 1 | 1 | 1 | 1 | 1 | 1 | 1 | 0 |
| 0 | 1 | 0 | 0 | 0 | 0 | 1 | 0 | 0 | 0 | 0 | 0 | 0 | 0 |
| 0 | 1 | 0 | 0 | 0 | 0 | 1 | 0 | 0 | 0 | 0 | 0 | 0 | 0 |
| 0 | 1 | 0 | 0 | 0 | 0 | 1 | 0 | 0 | 0 | 0 | 0 | 0 | 0 |
| 0 | 1 | 0 | 0 | 0 | 0 | 1 | 0 | 0 | 0 | 0 | 0 | 0 | 0 |
| 0 | 1 | 0 | 0 | 0 | 0 | 1 | 0 | 0 | 0 | 0 | 0 | 0 | 0 |
| 0 | 1 | 0 | 0 | 0 | 0 | 1 | 0 | 0 | 0 | 0 | 0 | 0 | 0 |
| 0 | 1 | 0 | 0 | 0 | 0 | 1 | 0 | 0 | 0 | 0 | 0 | 0 | 0 |
| 0 | 1 | 0 | 0 | 0 | 0 | 1 | 0 | 0 | 0 | 0 | 0 | 0 | 0 |
| 0 | 1 | 0 | 0 | 0 | 0 | 1 | 0 | 0 | 0 | 0 | 0 | 0 | 0 |
| 0 | 1 | 0 | 0 | 0 | 0 | 1 | 0 | 0 | 0 | 0 | 0 | 0 | 0 |

PARKING ASSISTANCE DEVICE AND PARKING ASSISTANCE METHOD

CROSS-REFERENCE TO RELATED APPLICATION

This application is a continuation application of International Application No. PCT/JP2021/004800 filed Feb. 9, 2021 which designated the U.S. and claims priority to Japanese Patent Application No. 2020-021696 filed with the Japan Patent Office on Feb. 12, 2020, the contents of each of which are incorporated herein by reference.

BACKGROUND

Technical Field

The present disclosure relates to a parking assistance device and a parking assistance method for generating a route to a scheduled parking location and moving a vehicle to the scheduled parking location by following the route during automatic parking or the like.

Related Art

Conventionally, a vehicle location detection device is known that is capable of detecting a location of a vehicle when it is located in an indoor facility, such as an indoor parking area. This vehicle location detection device detects a location of the vehicle in the indoor facility where Global Positioning System (GPS) is not available, based on location information included in an image code, such as a bar code, drawn on a road surface before an exit of the indoor parking area and captured by an in-vehicle camera.

BRIEF DESCRIPTION OF THE DRAWINGS

In the accompanying drawings:

FIG. 4 shows an example of obstacle information in a bitmap format.

DESCRIPTION OF SPECIFIC EMBODIMENTS

Figure 1:
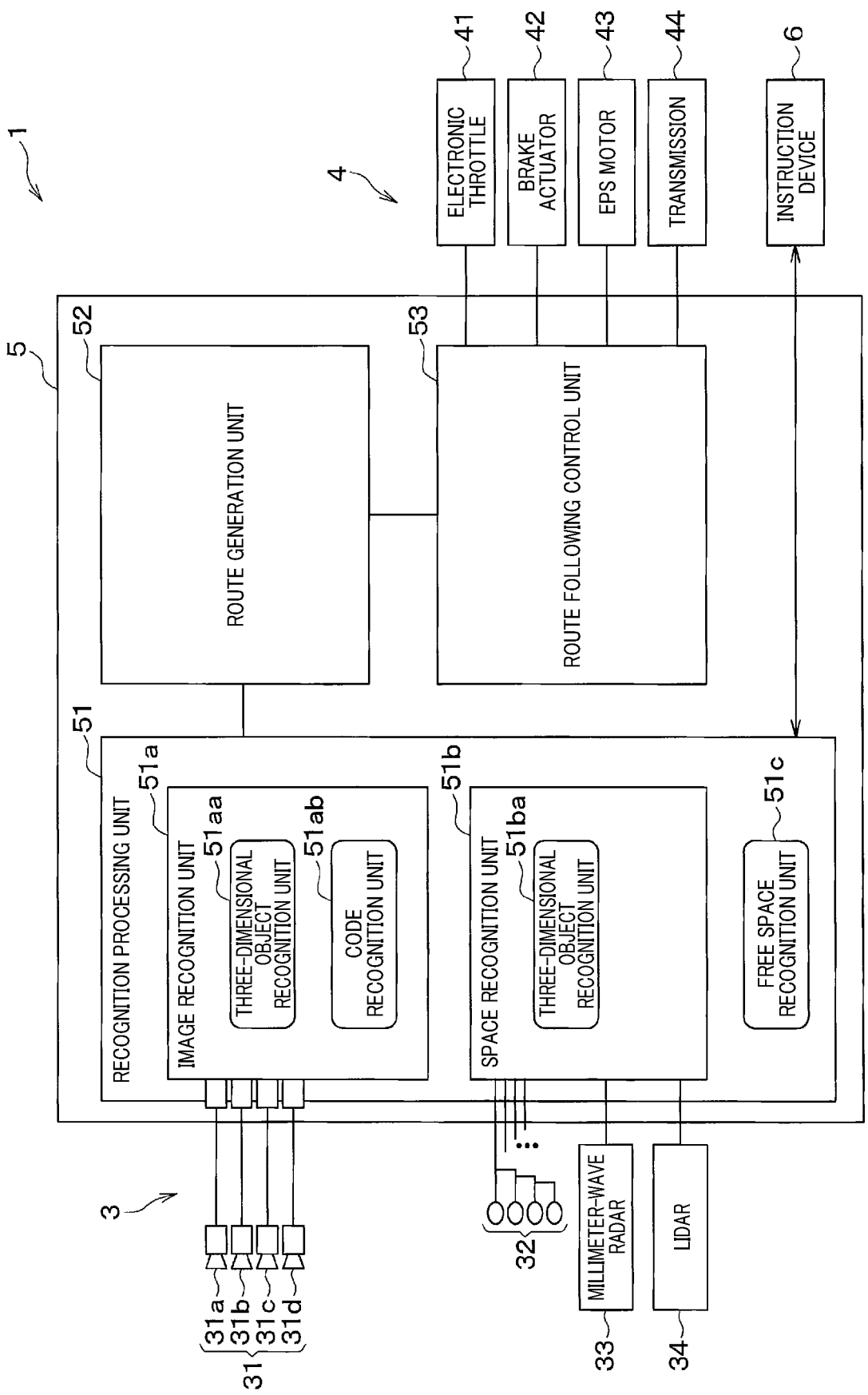
FIG. 1 is a block diagram of an automatic parking system according to a first embodiment.

The above known vehicle location detection device, as disclosed in JP 5015749 B, can only detect a location of the vehicle using an in-vehicle camera that is an existing in-vehicle device, which leads to insufficient information to provide parking assistance in parking in complex-shaped home parking areas or in valet parking areas.

In view of the foregoing, it is desired to have a parking assistance device and a parking assistance method for performing parking assistance control even in indoor facilities or the like, merely by utilizing existing in-vehicle devices.

One aspect of the present disclosure provides a parking assistance device for moving a vehicle from a current location to a scheduled parking location and parking the vehicle at the scheduled parking location. In the parking assistance device, a recognition processing unit is configured to perform code recognition to recognize parking information indicated by a parking assistance code. The parking assistance code includes the parking information that is information about a parking area. The parking information includes obstacle information which is information about obstacles located in the parking area, and target location information which is information about a target parking location. A route generation unit is configured to generate a travel route (hereinafter referred to as a parking route) from the current location to the scheduled parking location for moving the vehicle from the current location to the scheduled parking location that is set to the target parking location indicated by the target location information, while avoiding the obstacles indicated by the obstacle information. A route following control unit is configured to perform route following control to automatically move the vehicle following the parking route generated by the route generation unit from the current location to the scheduled parking location and park the vehicle at the scheduled parking location.

As above, parking assistance control is performed using a parking assistance code. The parking assistance code is configured to include at least obstacle information and target location information. Therefore, in an indoor facility, such as an indoor parking area, parking assistance control can be performed based on information other than location information of the own vehicle. As for the information other than location information of the own vehicle, only sensing information from existing surroundings monitoring sensors may be used to perform parking assistance control. Therefore, parking assistance control can be performed in indoor facilities simply by using existing in-vehicle devices.

Another aspect of the present disclosure provides a parking assistance method for moving a vehicle from a current location to a scheduled parking location and parking the vehicle at the scheduled parking location. The parking assistance method includes: performing code recognition to recognize parking information indicated by a parking assistance code, the parking assistance code including the parking information that is information about a parking area, the parking information including obstacle information which is information about obstacles located in the parking area, and target location information which is information about a target parking location; generating a parking route from the current location to the scheduled parking location for moving the vehicle from the current location to the scheduled parking location that is set to the target parking location indicated by the target location information, while avoiding the obstacles indicated by the obstacle information; and performing route following control to automatically move the vehicle following the parking route from the current location to the scheduled parking location and park the vehicle at the scheduled parking location.

In accordance with the parking assistance method configured as above, parking assistance control is performed using a parking assistance code. The parking assistance code is configured to include at least obstacle information and target location information. Therefore, in an indoor facility, such as an indoor parking area, parking assistance control can be performed based on information other than location information of the own vehicle. As for the information other than location information of the own vehicle, only sensing information from existing surroundings monitoring sensors may be used to perform parking assistance control. Therefore, parking assistance control can be performed in indoor facilities simply by using existing in-vehicle devices.

A first embodiment of the present disclosure will now be described. In the following embodiments, the same or equivalent parts are assigned with the same reference numerals in the drawings, and the same description is adopted for parts with the same reference numerals.

First Embodiment

An automatic parking system to which a parking assistance device and a parking assistance method of the present embodiment are applied will now be described. This automatic parking system performs parking assistance for automatic parking by generating a parking route from a current location of the vehicle to a parking location based on a locational relationship between the current location of the vehicle and a scheduled parking location, and then moving the vehicle along the parking route. Parking assistance is generally provided in flat parking areas, such as outdoor parking areas. In the present embodiment, the automatic parking system can also perform parking assistance in indoor parking areas and other areas where the location of the vehicle cannot be detected by the GPS. Parking assistance may be provided in various manners, such as displaying and pointing out parking routes or making announcements while parking. In the present embodiment, assistance for automatic parking is referred to as parking assistance.

As illustrated in FIG. 1, the automatic parking system 1 includes surroundings monitoring sensors 3, various actuators 4, a parking assistance device 5, and an instruction device 6. The parking assistance device 5 is communicatively connected to the surroundings monitoring sensors 3, the various actuators 4, and the instruction device 6 directly or via an in-vehicle local area network (LAN).

The surroundings monitoring sensors 3 are autonomous sensors that monitor surroundings of a vehicle carrying the surroundings monitoring sensors 3 (hereinafter referred to as an own vehicle). For example, the surroundings monitoring sensors 3 detect obstacles that are three-dimensional objects around the own vehicle including moving dynamic targets, such as pedestrians and other vehicles, and stationary and static targets, such as structures on roads, and parking assistance codes indicative of parking information that is information about parking areas. Probe wave sensors are provided as the surroundings monitoring sensors 3, including surroundings monitoring cameras 31 that capture images of a predefined region around the own vehicle, sonars 32, millimeter-wave radar 33, and LIDAR 34 that emit probe waves to a predefined region around the own vehicle.

The surroundings monitoring cameras 31, which correspond to imaging devices, capture images of surroundings of the own vehicle and output imaging data to the parking assistance device 5 as sensing information. In the present embodiment, the surroundings monitoring cameras 31 include, but are not limited to, a front camera 31a, a rear camera 31b, a left side camera 31c, and a right side camera 31d to capture forward, rearward, leftward, and rightward images of the own vehicle. Three-dimensional objects can be detected by analyzing the imaging data from the surroundings monitoring cameras 31.

The "three-dimensional objects" are objects with a spatial extent in three dimensions, such as three-dimensional structures, persons, or bicycles, which are subjected to detection by the surroundings monitoring sensors 3. The "obstacles" mean three-dimensional objects that are obstacles to movement of the own vehicle during performance of parking assist control. A three-dimensional object that is not an obstacle to movement of the own vehicle, such as a wall at a higher position than the own vehicle or a step that is low enough to get over, is not regarded as an "obstacle".

The probe wave sensors emit probe waves and acquire reflected waves, and thereby output to the parking assistance device 5 measurements as sensing information, such as a relative speed, a relative distance, and an azimuth angle of a target relative to the own vehicle. The sonars 32, which performs measurement using ultrasonic waves as probe waves, are disposed in a plurality of positions on the vehicle. For example, a plurality of sonars are disposed on the front and rear bumpers in the lateral direction of the vehicle to perform measurement by outputting probe waves toward surroundings of the vehicle. The millimeter wave radar 33 performs measurement using millimeter waves as probe waves, and the LIDAR 34 performs measurement using laser light as probe waves. Both of them, for example, emit probe waves to within a predefined region ahead of the vehicle and perform measurement within the predefined region.

In the present embodiment, the surroundings monitoring sensors 3 include the surroundings monitoring cameras 31, the sonars 32, the millimeter wave radar 33, and the LIDAR 34. Surroundings monitoring may be performed by combinations of one or more of these sensors, and all of these sensors do not have to be provided.

The parking assistance device 5 is configured as an electronic control unit (ECU) that functions as various control units to implement a parking assistance method in the automatic parking system 1. The parking assistance device is configured as a microcomputer including a central processing unit (CPU), a read-only memory (ROM), a random-access memory (RAM), and an input/output interface (I/O). In the present embodiment, during parking assistance, the parking assistance device 5 receives sensing information as a result of detection by the surroundings monitoring sensors 3 and performs various control processes for parking assistance based on the sensing information. Parking assistance is performed, for example, upon the driver operating the instruction device 6 to direct performance of parking assistance. Upon receiving an instruction for parking assistance, the parking assistance device 5 recognizes a free space available for parking based on the sensing information from the surroundings monitoring sensors 3, generates a route from the current location of the vehicle to the scheduled parking location during automatic parking, and performs route following control according to the route. Furthermore, the parking assistance device 5 performs route following control by identifying an available parking location indicated by the parking assistance code recognized by the surroundings monitoring sensors 3 and setting a scheduled parking location based on the available parking location via the instruction device 6. Specifically, the parking assistance device 5 is configured to include, as functional blocks to perform various control processes, a recognition processing unit 51, a route generation unit 52, and a route following control unit 53.

The recognition processing unit 51 receives sensing information from the surroundings monitoring sensors 3, and based on the sensing information, recognizes surroundings of the own vehicle going to be parked, specifically, three-dimensional objects around the own vehicle. In the present embodiment, the recognition processing unit 51 includes an image recognition unit 51a, a space recognition unit 51b, and a free space recognition unit 51c.

The image recognition unit 51a includes a three-dimensional object recognition unit 51aa and a code recognition unit 51ab. The three-dimensional object recognition unit 51aa receives imaging data from the surroundings monitoring cameras 31 as sensing information, and performs three-dimensional object recognition by image analysis of the imaging data. The code recognition unit 51ab receives imaging data from the surroundings monitoring cameras 31 as sensing information, and performs code recognition by image analysis of the imaging data.

In three-dimensional object recognition, three-dimensional objects, such as dynamic targets and static targets, located around the own vehicle are recognized as objects subjected to detection. Based on obstacles among the three-dimensional objects subjected to detection recognized by the three-dimensional object recognition, preferably, shapes of static targets among the obstacles, route generation described later will be performed.

Image data received from the surroundings monitoring cameras 31 includes images of the surroundings. The presence or absence of a three-dimensional object can be recognized by image analysis of the imaging data. Based on the shape of the recognized three-dimensional object or image optical flows, it is possible to determine whether the three-dimensional object is a dynamic or static target, and to detect a location of the three-dimensional object, that is, a position, a distance, and a height of the three-dimensional object relative to the own vehicle.

In code recognition, a parking assistance code is recognized, parking information indicated by the parking assistance code is extracted, and the parking information is forwarded to the route generation unit. The parking assistance code includes at least, as parking information, obstacle information for the parking area in the indoor facility, and target location information that is information about a target parking location. Preferably, the parking assistance code may further include self-location information indicating where in the parking area the parking assistance code itself is indicated, road surface inclination information indicating an inclination of a road surface in the parking area, and constraint information regarding parking constraints, such as a direction of movement when parking the own vehicle.

The parking assistance code may be any mark that can indicate parking information, such as a two-dimensional bar code or a graphic mark. Although the location of the parking assistance code is arbitrary, the parking assistance code may be displayed at the entrance of the parking area, that is, on a road surface at the entrance of the parking area or on a wall at the entrance gate, for example, by printing. The parking assistance code may also be displayed on a display, where changing the parking assistance code displayed on the display in accordance with a parking condition allows the parking assistance code to accurately indicate a location of an available parking space as a target parking location.

Recognition of the parking assistance code is performed by image analysis of the imaging data from the surroundings monitoring cameras 31. Since the imaging data received from the surroundings monitoring cameras 31 includes images of the surroundings, analyzing the imaging data allows for recognition of the parking assistance code included in the imaging data, thereby analyzing various items of parking information indicated by the parking assistance code.

The space recognition unit 51b includes a three-dimensional object recognition unit 51ba. The three-dimensional object recognition unit 51ba recognizes three-dimensional objects around the own vehicle based on sensing information from at least either the sonars 32, the millimeter wave radar 33, or the LIDAR 34. Three-dimensional object recognition performed by the three-dimensional object recognition unit 51ba is the same as that performed by the image recognition unit 51a. Therefore, provision of at least either the image recognition unit 51a or the space recognition unit 51b enables three-dimensional object recognition.

Although either the image recognition unit 51a or the space recognition unit 51b may be used to perform three-dimensional object recognition, use of both can lead to more accurate recognition of three-dimensional objects. For example, complementing three-dimensional object recognition by the image recognition unit 51a with three-dimensional object recognition by the space recognition unit 51b can lead to more accurate recognition of three-dimensional objects.

The free space recognition unit 51c performs free space recognition to recognize a free space in a parking area. The free space refers to a parking space in the parking area where no other vehicles are parked, having an area and a shape that allows the own vehicle to be parked. The present embodiment is not limited to cases where there are a plurality of parking spaces in the parking area, but also includes cases where there is only one parking space. A location recognized as such a free space is set as a scheduled parking location. The free space recognition unit 51c recognizes a free space in a parking area based on a result of three-dimensional object recognition by at least one of the image recognition unit 51a and the space recognition unit 51b. For example, the free space recognition unit 51c can determine the shape of the parking area and the presence or absence of other vehicles parked in the parking area based on the result of three-dimensional object recognition, which enables recognition of a free space in the parking area.

Free space recognition is not required for parking assistance control in indoor facilities or the like in cases where automatic parking is performed at the target parking location indicated by the parking assistance code. Even in such cases, performing free space recognition can lead to improved reliability. For example, it may be assumed that a location recognized as the target parking location is actually a location where parking is prohibited due to placement of no-parking road cones, or that there is no parking space large enough to park the own vehicle at the location recognized as the target parking location. In addition, in cases where there are a plurality of target parking locations, which of them is a free space may be recognized after the own vehicle reaches near the target parking location. In these cases, the reliability of parking assistance control in indoor facilities can be further increased by performing free-space recognition as well.

The route generation unit 52 generates a parking route from the current location of the own vehicle to the scheduled parking location. Although the route generation unit 52 performs route generation for both normal parking assistance control that using no parking assistance codes (hereinafter referred to as normal assistance control) and parking assistance control using parking assistance codes (hereinafter referred to as code-based control), the route generation unit uses a different method.

Specifically, during normal assistance control, the route generation unit 52 performs three-dimensional object recognition and free space recognition based on the sensing information from the surroundings monitoring sensors 3 and generates a route based on recognition results. That is, the route generation unit 52 calculates a travel route from the current location of the own vehicle to the scheduled parking location recognized by free space recognition while avoiding obstacles recognized by three-dimensional object recognition, and generates a route indicated by a result of calculation as the parking route.

Figure 2:
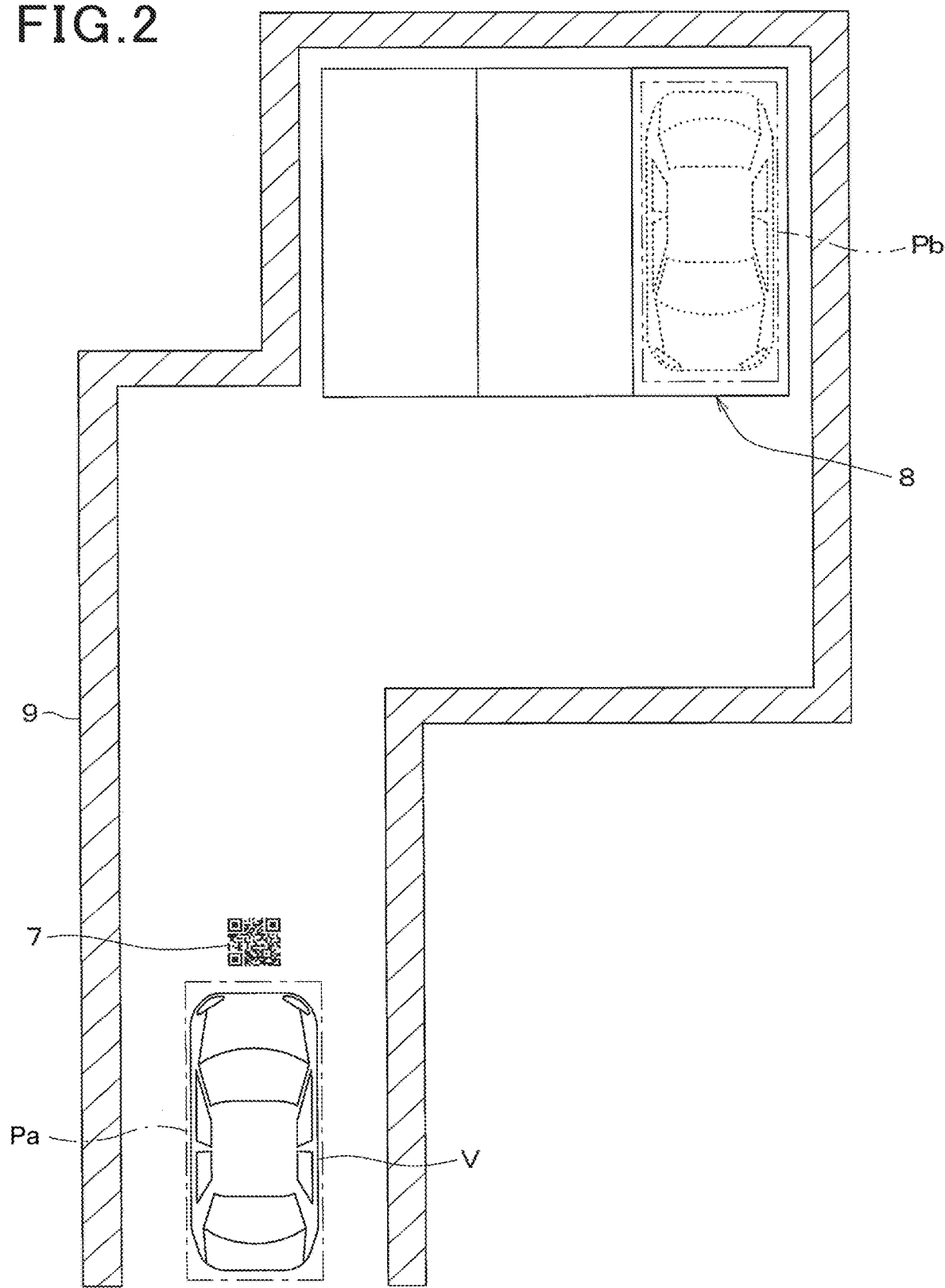
FIG. 2 is a bird's-eye view of parking in an indoor parking area.

In code-based control, the route generation unit 52 generates a route based on the parking information indicated by the parking assistance code. That is, as illustrated in FIG. 2, the route generation unit 52 sets the scheduled parking location Pb to the target parking location 8 indicated by the parking assistance code 7. The route generation unit 52 then calculates a travel route from the current location Pa of the own vehicle V to the scheduled parking location Pb indicated as the target parking location 8, and generates the travel route indicated by the calculation result as a parking route. In cases where there is a plurality of target parking locations 8 and the driver of the own vehicle V can select one of the plurality of target parking locations 8 using the instruction device 6, the route generation unit 52 calculates a parking route by setting the scheduled parking location Pb to the selected one of the plurality of target parking locations 8.

Furthermore, when performing code-based control, the route generation unit 52 generates a route taking into account the obstacle information for the parking area in the indoor facility included in the parking assistance code 7. The obstacle information is information about walls 9, poles, pillars, and other obstacles in the indoor parking area that the own vehicle may come into contact with when attempting to be parked. Therefore, the route generation unit 52 generates a parking route that avoids the obstacles indicated by the obstacle information when generating the route.

In cases where there is any constraint in route generation, the route generation unit 52 generates the parking route so as to meet the constraint. For example, when the parking assistance code includes constraint information, the route generation unit 52 generates the parking route so as to meet the constraint. For example, the route generation unit 52 generates the parking route such that the number of turns is minimized within a predefined region. In cases where there is a constraint on the direction of parking, that is, the direction of entry into the scheduled parking location, the route generation unit 52 calculates the parking route taking into account this constraint.

For example, in the case of forward parking, where the own vehicle V is moved forward to and parked at the scheduled parking location Pb, or in the case of reverse parking, where the own vehicle is moved backward to and parked at the scheduled parking location, the orientation of the own vehicle V when parked is a constraint. As to the orientation of the own vehicle V when parked, not only in cases where the parking assistance code includes parking information regarding the orientation of the own vehicle, but also in cases where the imaging data from the surroundings monitoring cameras 31 includes a sign indicating "FORWARD PARKING" or "REVERSE PARKING," such information may be included in the constraint. In cases where there is a setting switch for the user to set the orientation of the own vehicle V when parked, the orientation of the own vehicle when parked may also be included in the constraint according to a switch position of the setting switch.

Although obstacles, which are three-dimensional objects recognized by three-dimensional object recognition, are avoided when generating a parking route, the parking route may be generated by avoiding only static targets among the obstacles. Since dynamic targets are moving, the own vehicle may be moved only after the risk of collision with dynamic targets is eliminated, where it is sufficient to generate a parking route taking into account only static targets.

The route following control unit 53 is the functional block that performs route following control by performing vehicle movement control, such as acceleration/deceleration control and steering control of the own vehicle V. The route following control unit 53 outputs control signals to various actuators 4 such that the own vehicle V can be moved and parked at the scheduled parking location Pb by following the parking route generated by the route generation unit 52. The parking assistance device 5 is configured as a single ECU including the route following control unit 53 therein. Alternatively, the parking assistance device 5 may be configured as a combination of a plurality of ECUs, where the route following control unit 53 may be implemented by these ECUs. The plurality of ECUs include, for example, a steering ECU for steering control, a power unit control ECU for acceleration/deceleration control, and a brake ECU.

Specifically, the route following control unit 53 acquires detection signals output from the sensors mounted on the own vehicle V, such as an accelerator position sensor, a brake pedal force sensor, a steering angle sensor, a wheel speed sensor, and a shift position sensor, although not shown. The route following control unit 53 detects a state of each part of the own vehicle from the acquired detection signals and outputs control signals to various actuators 4 to cause the own vehicle V to move following the parking route.

The various actuators 4 are various driving control devices that are involved in driving and stopping the own vehicle, such as electronic throttle 41, a brake actuator 42, an electric power steering (EPS) motor 43, a transmission 44, and others. These various actuators 4 are controlled based on control signals from the route following control unit 53 to control a travel direction, a steering angle, and a braking torque of the own vehicle V. This enables parking assistance control, including route following control to cause the own vehicle V to move according to the parking route and be parked at the scheduled parking location Pb.

When moving the own vehicle V from the current location Pa to the scheduled parking location Pb, the own vehicle V only has to follow the travel route. However, a person or another vehicle may approach the own vehicle while moving. In such a case, the own vehicle will keep itself stopped until the dynamic target is outside a region of a scheduled travel trajectory of the own vehicle V that is estimated based on the parking route and a vehicle width, thereby avoiding a collision between the own vehicle V and the dynamic target. In addition, there may be a static target that was not recognized when the parking route was first calculated, for example, the scheduled parking location Pb may no longer be a free space due to placement of road cones at the scheduled parking location Pb. Thus, three-dimensional object recognition by the three-dimensional object recognition units 51*aa*, 51*ba* and free space recognition by the free space recognition unit 51*c* are continued even while the own vehicle is moving following the parking route. In cases where a static target is present in a location that could cause a collision if the own vehicle V were to follow the parking route, the parking route will be regenerated. In cases where the scheduled parking location Pb is no longer a free space, a new free space is set as the scheduled parking location Pb and then the parking route is regenerated.

The instruction device 6 is a human machine interface (HMI) part and is configured as, for example, a touch panel display in a navigation device. This instruction device 6 allows for various indications related to parking assistance control, and operational inputs by the driver of the own vehicle. For example, the instruction device 6 allows for switch indication that direct performance of parking assistance control, indication of the target parking location, and selection of the scheduled parking location Pb by touching the displayed target parking location.

The automatic parking system 1 of the present embodiment is configured as described above. Operations of the automatic parking system 1 thus configured will now be described. Operations of the automatic parking system 1 include normal parking assistance control and code-based control. The latter will particularly be described in detail while the former will be briefly described.

First, normal assistance control will be described. Normal assistance control is performed, for example, in response to the instruction device 6 being operated to direct performance of parking assistance control. Specifically, a recognition process is initiated. The recognition process means receiving sensing information from the surroundings monitoring sensors 3 and performing the above-mentioned three-dimensional object recognition and free space recognition based on the received sensing information. Upon completion of the recognition process, a parking route is generated. This parking route is generated in the above-described manner. The route following process is then performed. Specifically, control signals are output to various actuators 4 such that the own vehicle V can move from the current location Pa to the scheduled parking location Pb following the generated parking route and can be parked at the generated parking route. In this way, the various actuators 4 are driven to control the travel direction, the steering angle, and the braking torque of the own vehicle V, thereby causing the own vehicle V to move following the parking route. The own vehicle is then parked at the scheduled parking location Pb.

Figure 3:
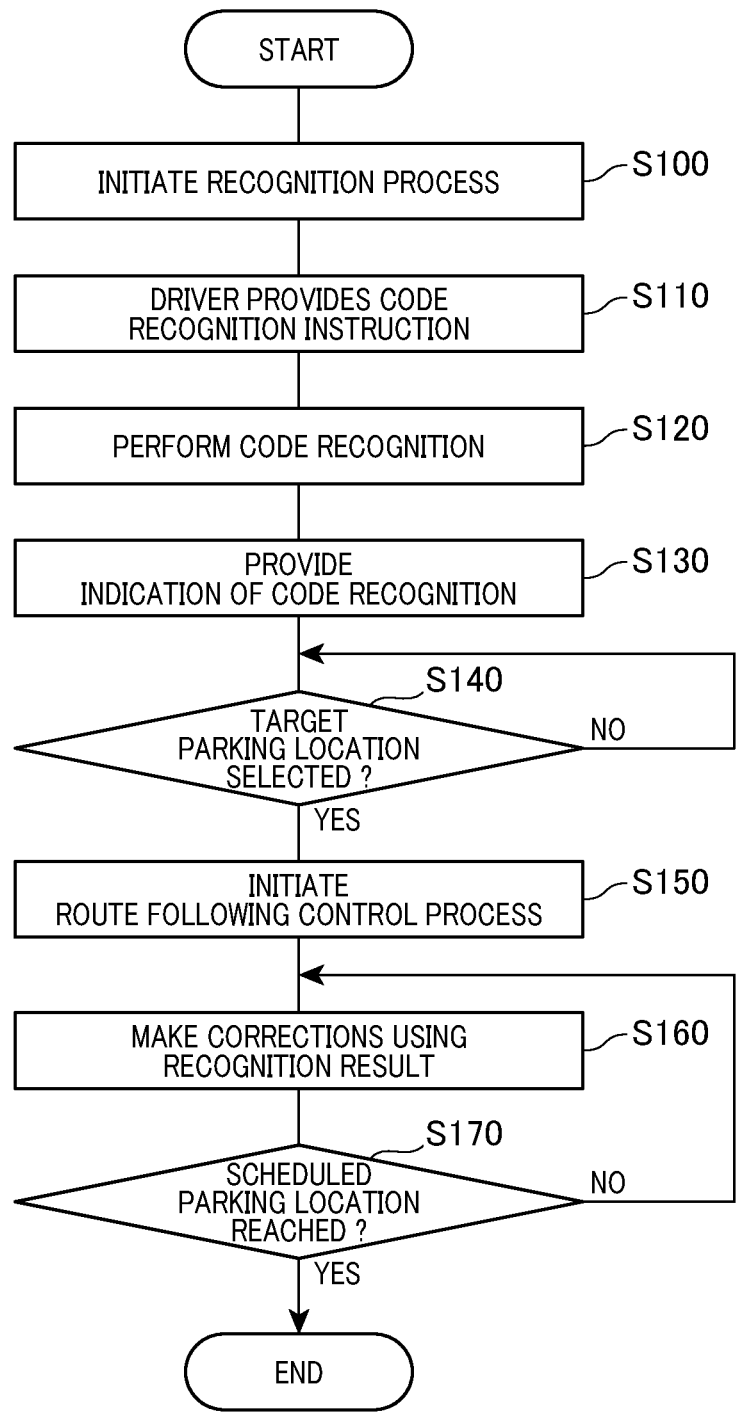
FIG. 3 is a flowchart of parking assistance control using a parking assistance code.

Code-based control will then be described with reference to the flowchart of code-based control illustrated in FIG. 3. The process illustrated in FIG. 3 is performed every predefined control cycle, for example, while a start switch, such as an ignition switch (not shown), is on. The process steps in this flowchart are implemented by respective functional blocks of the parking assistance device 5. The process steps in this flowchart can also be understood as respective steps of the parking assistance method.

First, at step S100, the recognition process is initiated. The recognition process here is the same as the recognition process during normal support control described above. After initiation of the recognition process, when the driver stops the own vehicle V at a location where the parking assistance code can be recognized, for example, at the entrance of a parking area in an indoor facility, the driver provides a code recognition instruction to recognize the parking assistance code via the instruction device 6. Upon the code recognition instruction being provided at step S110, the parking assistance code is recognized at step S120 from imaging data recognized by the surroundings monitoring cameras 31 at step S100. This allows various items of parking information indicated by the parking assistance code to be recognized. Then, based on the self-location information included in the parking assistance code, the current location Pa of the own vehicle V in the parking area is recognized.

Subsequently, at step S130, an indication is provided on the instruction device 6 based on various items of parking information indicated by the parking assistance code. In cases where there are a plurality of target parking locations, the instruction device 6 displays an indication for the driver to select one of the plurality of target parking locations. The indication may be displayed in various forms. For example, in cases where there is only one target parking location, the indication may be displayed so as to allow the driver to select whether that location is acceptable, or whether automatic parking may be initiated.

Thereafter, at step S140, it is determined whether the driver has selected a target parking location. If the answer is YES, the process flow proceeds to step S150. If the answer is NO, the process step S140 is repeated until the selection is made.

Subsequently, at step S150, the route following control process is initiated. First, the target parking location selected by the user is set as a scheduled parking location Pb, and a parking route is generated from the current location Pa of the own vehicle V to the scheduled parking location Pb. This parking route is generated in the manner as described above, taking into account information on obstacles in the parking area of the indoor facility included in the parking assistance code. In cases where the parking assistance code includes constraint information, the parking route is generated so as to meet the constraint indicated by the constraint information.

Thereafter, the route following control process is performed. Specifically, control signals are output to various actuators 4 such that the own vehicle V can move from its current location Pa following the generated parking rout and get parked at the scheduled parking location Pb. This causes the various actuators 4 to be driven to control the travel direction, the steering angle, and the braking torque of the own vehicle V, thereby causing the own vehicle V to move following the parking route.

At step S160, the recognition process is repeated as in step S100, and corrections are made based on a result of the recognition process. When the parking route using the parking assistance code needs to be corrected, for example, when a static target that was not in the parking information included in the parking assistance mark is detected and the parking route needs to be changed, a new parking route will be generated. When a dynamic target enters a region in the direction of travel on the parking route while the own vehicle V is moving, movement of the own vehicle V is suspended and movement of the own vehicle V is resumed after the dynamic target has moved away and is no longer likely to come into contact with the own vehicle V. In addition, when the parking assistance code includes road surface inclination information as parking information, sensing distortion of the surroundings monitoring sensors may be corrected based on the road surface inclination information, thereby providing more accurate detection results.

At step S170, it is determined whether the own vehicle V has reached the scheduled parking location Pb. If the answer is YES, the parking assistance control is terminated, and if the answer is NO, the process step S160 is repeated. In this way, the own vehicle is allowed to be parked at the scheduled parking location Pb.

As described above, the automatic parking system 1 of the present embodiment is configured such that parking assistance control is performed using a parking assistance code. The parking assistance code is configured to include at least obstacle information and target location information. Therefore, in an indoor facility, such as an indoor parking area, parking assistance control can be performed based on information other than location information of the own vehicle V. As for the information other than location information of the own vehicle, only sensing information from existing surroundings monitoring sensors may be used to perform parking assistance control. Therefore, parking assistance control can be performed in indoor facilities simply by using existing in-vehicle devices.

Including self-location information in the parking assistance code allows a location of the parking assistance code in the parking area to be accurately detected when the surroundings monitoring sensors 3 detects the parking assistance code. Therefore, the current location Pa of the own vehicle V can be accurately recognized from the location of the parking assistance code, which enables more accurate parking assistance control.

Further including road surface inclination information in the parking assistance code allows sensing distortion of the surroundings monitoring sensors 3 to be corrected during movement of the own vehicle under the parking assistance control, thereby leading to more accurate detection results. This enables more accurate parking assistance control.

Other Embodiments

Although the present disclosure has been described in accordance with the above-described embodiments, it is not limited to such embodiments, but also encompasses various variations and variations within equal scope. In addition, various combinations and forms, as well as other combinations and forms, including only one element, more or less, thereof, are also within the scope and idea of the present disclosure.

(1) For example, in the above embodiment, inclusion of obstacle information in the parking assistance code has been described, but various forms of obstacle information may be applied. For example, as illustrated in FIG. 4, the parking area illustrated in FIG. 2 may be divided into a plurality of cells in a grid pattern, with each cell labeled "1" if there is an obstacle and "0" if there is no obstacle. Data regarding the presence or absence of an obstacle may be stored in a bitmap format. Alternatively, information about corner portions of wall surfaces that are obstacles may be stored. In this case, it is possible to determine the presence or absence of an obstacle by connecting the information about the corner portions.

(2) In the above embodiment, use of the parking assistance code in indoor facilities has been described as an example. Parking assistance control may be performed using the parking assistance code not only in indoor facilities but also in other facilities.

(3) In the above embodiment, the instruction device 6 is a display in a navigation device, but other devices may be used as the instruction device 6. In cases where a parking area provider provides parking service for parking the own vehicle at the scheduled parking location Pb, such as in the valet parking system, it may be assumed that a parking area guidance device owned by the parking area provider may be used as the instruction device 6, and that the instruction device 6 and the parking assistance device 5 may be wirelessly communicate with each other. It may also be assumed that the driver himself/herself, not a parking area provider, uses a smartphone or other devices as the instruction device 6 to perform automatic parking under parking assistance control while the driver is outside the own vehicle. In such a case, the instruction device 6 may be configured as an external device rather than an in-vehicle device.

(4) In the above embodiment, the self-location information of the parking assistance code is indicated. In cases where a plurality of parking assistance codes are provided in a parking area, in addition to the self-location information, other location information of the other parking assistance codes, which is location information about locations of the other parking assistance codes, may also be included. In such a case that the other location information is included, the parking route may be set to pass through some or all of the other parking assistance codes based on the other location information, which allows whether the own vehicle is following the parking route to be checked when any of the other parking assistance codes are recognized and allows the following control process to be corrected as needed.

(5) The control unit and the method thereof described in the present disclosure may be implemented by a dedicated computer provided by configuring a processor and a memory programmed to execute one or more functions embodied by a computer program. Alternatively, the control unit and the method thereof described in the present disclosure may be implemented by a dedicated computer provided by configuring a processor with one or more dedicated hardware logic circuits. Alternatively, the control unit and the method thereof described in the present disclosure may be implemented by one or more dedicated computers configured by a combination of a processor and a memory programmed to execute one or more functions and a processor configured by one or more hardware logic circuits. Furthermore, the computer program may be stored as instructions executed by a computer in a non-transitory tangible computer-readable storage medium.

What is claimed is:

1. A parking assistance device for moving a vehicle from a current location to a scheduled parking location and parking the vehicle at the scheduled parking location, comprising:
    a recognition processing unit configured to perform code recognition to recognize parking information indicated by a parking assistance code, the parking assistance code comprising a marking, provided in a parking area, to be detected by an on-board camera that monitors surroundings of the vehicle and including the parking information that is information about a parking area, the parking information including obstacle information which is information about obstacles located in the parking area, and target location information which is information about a target parking location;
    a route generation unit configured to generate a parking route from the current location to the scheduled parking location for moving the vehicle from the current location to the scheduled parking location that is set to the target parking location indicated by the target location information, while avoiding the obstacles indicated by the obstacle information; and
    a route following control unit configured to perform route following control to automatically move the vehicle following the parking route generated by the route generation unit from the current location to the scheduled parking location and park the vehicle at the scheduled parking location, wherein
    the parking information includes road surface inclination information indicating an inclination of a road surface in the parking area, and
    the recognition processing unit is configured to correct for sensing distortion of the on-board camera based on the road surface inclination information.

2. The parking assistance device according to claim 1, wherein
    the parking information includes self-location information indicating a location of the parking assistance code itself in the parking area, and
    the route generation unit is configured to recognize the current location of the vehicle in the parking area based on the self-location information.

3. The parking assistance device according to claim 1, wherein
the recognition processing unit is configured to perform three-dimensional object recognition to recognize three-dimensional objects in a space surrounding the vehicle based on sensing information from the on-board camera, and free space recognition to recognize a free space for the vehicle to be parked in the parking area based on a result of the three-dimensional object recognition, and
the route generation unit is configured to regenerate the parking route based on the three-dimensional object recognition and the free space recognition by the recognition processing unit even during the route following control.

4. The parking assistance device according to claim 1, wherein
the recognition processing unit is configured to, upon receipt of an instruction to recognize the parking assistance code via an instruction device, perform the code recognition, and
the route generation unit is configured to, in response to the code recognition having been performed, generate the parking route based on the obstacle information and the target location information included in the parking assistance code.

5. The parking assistance device according to claim 1, wherein
the route generation unit is configured to, in response to there being a plurality of target parking locations indicated by the target location information, cause a vehicle user to select, as the scheduled parking location, one of the plurality of target parking locations via an instruction device.

6. A parking assistance method for moving a vehicle from a current location to a scheduled parking location and parking the vehicle at the scheduled parking location, comprising:
performing code recognition to recognize parking information indicated by a parking assistance code, the parking assistance code comprising a marking, provided in a parking area, to be detected by an on-board camera that monitors surroundings of the vehicle and including the parking information that is information about a parking area, the parking information including obstacle information which is information about obstacles located in the parking area, and target location information which is information about a target parking location;
generating a parking route from the current location to the scheduled parking location for moving the vehicle from the current location to the scheduled parking location that is set to the target parking location indicated by the target location information, while avoiding the obstacles indicated by the obstacle information; and
performing route following control to automatically move the vehicle following the parking route from the current location to the scheduled parking location and park the vehicle at the scheduled parking location, wherein
the parking information includes road surface inclination information indicating an inclination of a road surface in the parking area, and
sensing distortion of the on-board camera is corrected based on the road surface inclination information.

7. A parking assistance device for moving a vehicle from a current location to a scheduled parking location and parking the vehicle at the scheduled parking location, comprising:
a non-transitory memory storing one or more computer programs;
a processor executing the one or more computer programs to:
perform code recognition to recognize parking information indicated by a parking assistance code, the parking assistance code comprising a marking, provided in a parking area, to be detected by an on-board camera that monitors surroundings of the vehicle and including the parking information that is information about a parking area, the parking information including obstacle information which is information about obstacles located in the parking area, and target location information which is information about a target parking location;
generate a parking route from the current location to the scheduled parking location for moving the vehicle from the current location to the scheduled parking location that is set to the target parking location indicated by the target location information, while avoiding the obstacles indicated by the obstacle information; and
perform route following control to automatically move the vehicle following the generated parking route from the current location to the scheduled parking location and park the vehicle at the scheduled parking location, wherein
the parking information includes road surface inclination information indicating an inclination of a road surface in the parking area, and
sensing distortion of the on-board camera is corrected based on the road surface inclination information.

* * * * *